US011457668B2

(12) United States Patent
Hu

(10) Patent No.: US 11,457,668 B2
(45) Date of Patent: Oct. 4, 2022

(54) ELECTRONIC ATOMIZING DEVICE AND LIQUID INJECTING STRUCTURE THEREOF

(71) Applicant: SHENZHEN SMOORE TECHNOLOGY LIMITED, Shenzhen (CN)

(72) Inventor: Weiguang Hu, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 365 days.

(21) Appl. No.: 16/737,917

(22) Filed: Jan. 9, 2020

(65) Prior Publication Data

US 2020/0214353 A1 Jul. 9, 2020

(30) Foreign Application Priority Data

Jan. 9, 2019 (CN) ......................... 201910020622.3

(51) Int. Cl.
*A24F 13/00* (2006.01)
*A24F 40/49* (2020.01)
(Continued)

(52) U.S. Cl.
CPC .............. *A24F 40/49* (2020.01); *A24F 40/10* (2020.01); *A24F 40/48* (2020.01); *A24F 40/50* (2020.01); *F16J 15/022* (2013.01)

(58) Field of Classification Search
CPC ....................................................... A24F 47/00
(Continued)

(56) References Cited

U.S. PATENT DOCUMENTS

2011/0193004 A1* 8/2011 Lahaye .............. B65D 75/5861 251/304
2017/0001854 A1 1/2017 Li et al.

FOREIGN PATENT DOCUMENTS

CN 104382237 3/2015
CN 205456057 8/2016
(Continued)

OTHER PUBLICATIONS

"Search Report of Europe Counterpart Application", dated Jun. 8, 2020, p. 1-p. 9.

(Continued)

*Primary Examiner* — Phuong K Dinh
(74) *Attorney, Agent, or Firm* — JCIP Global Inc.

(57) ABSTRACT

The present invention relates to an electronic atomizing device and a liquid injecting structure thereof. The liquid injecting structure includes an outer tube and a liquid injection assembly in the outer tube. The outer tube defines an inlet port, the liquid injection assembly includes a switch assembly rotatable between an injecting position and a working position relative to the outer tube; the switch assembly includes a liquid injection tube defining an injecting port. When the switch assembly is in the injecting position, the injecting port is fluidly communicated with the inlet port, such that liquid can be injected into a liquid storage cavity; when the switch assembly is in the working position, the injecting port is isolated from the inlet port. The rotation operation is child-resistant; when the switch assembly is in the working position, the liquid injecting structure is shielded by a battery and cannot be opened accidentally.

18 Claims, 14 Drawing Sheets

(51) Int. Cl.

| | |
|---|---|
| ***A24F 40/48*** | (2020.01) |
| ***A24F 40/10*** | (2020.01) |
| ***A24F 40/50*** | (2020.01) |
| ***F16J 15/02*** | (2006.01) |

(58) Field of Classification Search
USPC .................................................. 131/328–329
See application file for complete search history.

(56) References Cited

FOREIGN PATENT DOCUMENTS

| | | |
|---|---|---|
| CN | 108294365 | 7/2018 |
| EP | 3047743 | 7/2016 |
| JP | H08171192 | 7/1996 |
| WO | 2016124717 | 8/2016 |

OTHER PUBLICATIONS

"Search Report of Europe Counterpart Application, Application No. 20150711.8", dated Jun. 8, 2020, p. 1-p. 9.
"Office Action of Europe Counterpart Application, Application No. 20150711.8", dated Feb. 11, 2022, p. 1 -p. 6.

* cited by examiner

ELECTRONIC ATOMIZING DEVICE AND LIQUID INJECTING STRUCTURE THEREOF

CROSS REFERENCE TO RELATED APPLICATION

The present invention is based upon and claims the benefit of priority from the prior Chinese Patent Application No. 201910020622.3 filed on Jan. 9, 2019; the entirety of the above-mentioned patent application is hereby incorporated by reference herein and made a part of this specification.

TECHNICAL FIELD

The present invention relates to the technical field of atomization, and specifically to an electronic atomizing device and a liquid injecting structure thereof.

BACKGROUND

Electronic cigarettes are also known as virtual cigarettes or electronic atomizing devices. With similar appearance and flavor to conventional cigarettes, the electronic atomizing devices are generally free of harmful chemicals like tar or aerosol in the cigarettes.

An electronic atomizing device mainly includes a liquid storage cavity, an atomizer disposed at one end of the liquid storage cavity, and a nozzle disposed at another end of the liquid storage cavity. Typically, the liquid storage cavity is refilled with liquid by twisting off the nozzle. However, the nozzle in certain conventional electronic atomizing device is likely twisted off by children, which may result in the liquid being contacted or even swallowed by the children. Besides, a leakage may be occurred due to air pressure in a process of liquid injection.

Technical Problem

Therefore, the technical problem to be solved by the present invention is to provide an improved electronic atomizing device and a liquid injecting structure thereof.

SUMMARY

The technical solution adopted by the invention to solve the technical problem is to construct a liquid injecting structure for an electronic atomizing device, including an outer tube and a liquid injection assembly disposed in the outer tube; wherein, the outer tube defines an inlet port; the liquid injection assembly includes a switch assembly, the switch assembly is rotatable between an injecting position and a working position relative to the outer tube; the switch assembly includes a liquid injection tube which defines an injecting port; and when the switch assembly is in the injecting position, the injecting port is fluidly communicated with the inlet port, such that liquid can be injected into a liquid storage cavity; and when the switch assembly is in the working position, the injecting port is isolated from the inlet port.

Preferably, the switch assembly includes a first sealing member which is circumferentially fixed and rotates synchronously with the liquid injection tube, and the first sealing member defines a first flow port; and when the switch assembly is in the injecting position, the inlet port is fluidly communicated with the injecting port via the first flow port; and when the switch assembly is in the working position, the first flow port is isolated from the inlet port.

Preferably, the liquid injection assembly further includes a tubular second sealing member disposed between the outer tube and the liquid injection tube; the second sealing member defines a second flow port, and is circumferentially fixed with the outer tube; and the injecting port and the first flow port are respectively defined in an inner side and an outer side of the second sealing member; when the switch assembly is in the injecting position, the injecting port is fluidly communicated with the first flow port via the second flow port; and when the liquid injection assembly is in the working position, the second flow port is isolated from the injecting port and the first flow port.

Preferably, the first sealing member is disposed at an inner end of the liquid injection tube, and the first flow port is defined in an outer surface of the first sealing member.

Preferably, the outer tube includes a body and an end wall disposed at an inner end of the body; the inlet port is defined on the end wall, the first flow port is defined on the outer surface of the first sealing member and extends axially, and the second flow port is defined at an end portion of the second sealing member which is proximate to the first sealing member.

Preferably, a connecting shaft is provided to connect the first sealing member and the liquid injection tube, the second sealing member further includes an annular flange which is disposed between the liquid injection tube and the first sealing member and isolates the liquid injection tube from the first sealing member; the connecting shaft extends through the annular flange.

Preferably, the switch assembly further includes an elastic member sleeved on a peripheral of the connecting shaft; two ends of the elastic member abut against the annular flange and the first sealing member respectively, and the first sealing member is attached to the end wall under an elastic force of the elastic member.

Preferably, an operating portion for driving the liquid injection assembly to rotate is provided on the liquid injection assembly, the operating portion includes a first rotating arm disposed on the liquid injection tube, and the first rotating arm extends outwardly from an outer surface of the liquid injection tube; and an outer end portion of the second sealing member defines an arcuate first rotating recess along a circumferential direction; the first rotating arm is arranged in the first rotating recess in a manner enabling to swing in the circumferential direction, to define a rotation range of the switch assembly.

Preferably, the outer tube further defines an exhaust port for exhausting air in the liquid storage cavity, and an outlet passage for allowing the exhaust port to be fluidly communicated with an outer atmosphere is defined between the outer tube and the liquid injection assembly; and when the switch assembly is in the injecting position, the exhaust port is fluidly communicated with the outlet passage; and when the switch assembly is in the working position, the exhaust port is isolated from the outlet passage.

Preferably, the exhaust port is defined on a side wall of the outer tube, and the first sealing member further defines a third flow port for fluidly connecting the exhaust port to the outer atmosphere when the switch assembly is in the injecting position.

Preferably, the liquid injection assembly further includes a tubular second sealing member sleeved between the outer tube and the liquid injection tube; a fourth flow port is defined on an outer surface of the second sealing member along an axial direction; when the switch assembly is in the injecting position, the exhaust port is fluidly communicated with the fourth flow port via the third flow port; and when the liquid injection assembly is in the working position, the third flow port is isolated from the exhaust port and the fourth flow port.

Preferably, the first sealing member is sleeved between the liquid injection tube and the outer tube, and the inlet port is defined on a side wall of the outer tube.

Preferably, the outer tube further defines an exhaust port for exhausting air in the liquid storage cavity, and the exhaust port is defined on a side wall of the outer tube; a fifth flow port fluidly communicated with an outer atmosphere is defined on an outer surface of the first sealing member in an axial direction; and when the switch assembly is in the injecting position, the fifth flow port is fluidly communicated with the exhaust port; and when the liquid injection assembly is in the working position, the fifth flow port is isolated from the exhaust port.

Preferably, an operating portion for driving the liquid injection assembly to rotate is provided on the liquid injection assembly, and the operating portion includes a second rotating arm extending outwardly; and an outer end portion of the outer tube defines an arcuate second rotating recess along a circumferential direction; the second rotating arm is arranged in the second rotating recess in a manner enabling to swing in the circumferential direction, to define a rotation range of the switch assembly.

Preferably, the switch assembly includes a collar sleeved outside an outer end of the liquid injection tube, and the second rotating arm extends outwardly from an outer surface of the collar.

Preferably, the outer tube includes a body and an end wall disposed at an inner end of the body, a rotating shaft rotatably matched with the end wall is provided at the inner end of the liquid injection tube, the rotating shaft is locked with the end wall for axial positioning, and a sealing ring is provided at an end of the rotating shaft which extends out of the end wall.

An electronic atomizing device including a liquid storage cavity and the above liquid injecting structure, wherein the liquid injecting structure is disposed on a cavity wall which defines the liquid storage cavity, and an inlet port of the liquid injecting structure is fluidly communicated with the liquid storage cavity.

Implementing the electronic atomizing device and the liquid injecting structure thereof of the invention has the following beneficial effects: with the liquid injecting structure, the switch assembly is easily able to rotate between the injecting position to realize a liquid injection operation and the working position to stop the liquid injection operation; the rotation operation can prevent children from contacting liquid to improve safety; besides, when the electronic atomizing device is in the working position for a user's drawing operation, the liquid injecting structure is shielded by a battery and cannot be opened accidentally.

To make the aforementioned more comprehensible, several embodiments accompanied with drawings are described in detail as follows.

BRIEF DESCRIPTION OF THE DRAWINGS

The present invention will now be further described with reference to the accompanying drawings and embodiments.

DETAILED DESCRIPTION

In order to render a more apparent understanding of technical features, objects and effects of the present invention, specific embodiments thereof will be described in detail with reference to the accompanying drawings.

Figure 1:
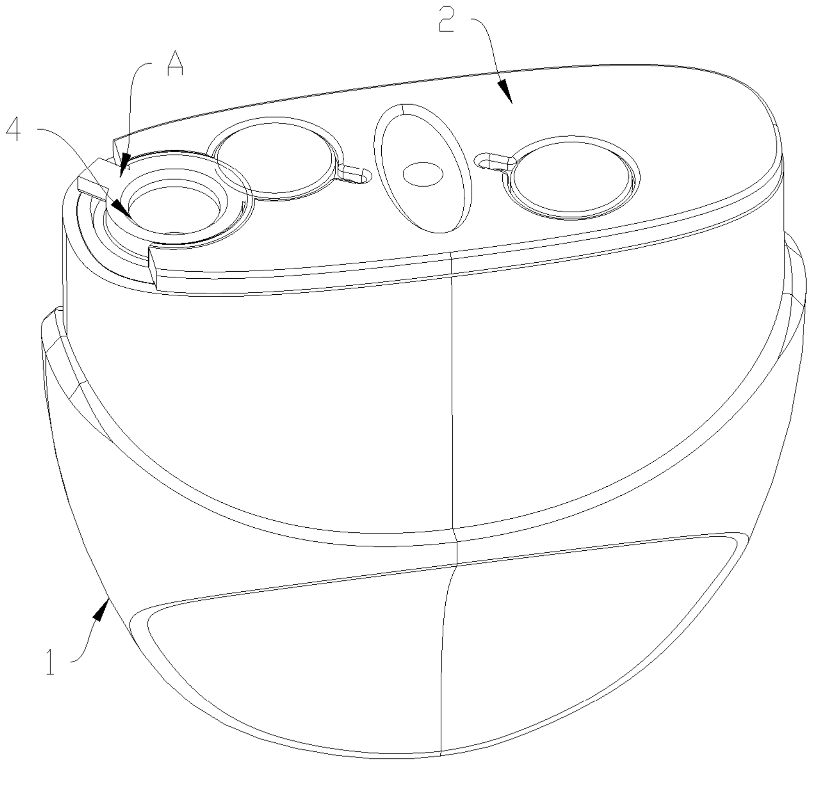
FIG. 1 is a schematic structural diagram of an atomizer of an electronic atomizing device when a switch assembly thereof is in an injecting position according to an embodiment of the present invention.
Figure 2:
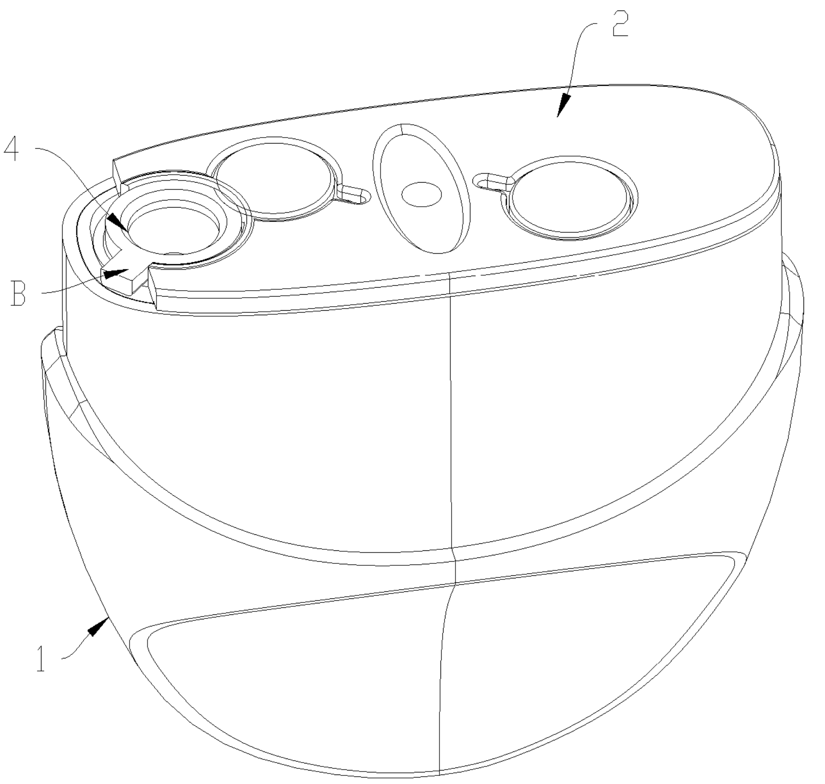
FIG. 2 is a schematic structural diagram of the atomizer of the electronic atomizing device when the switch assembly thereof is in a working position.
Figure 3:
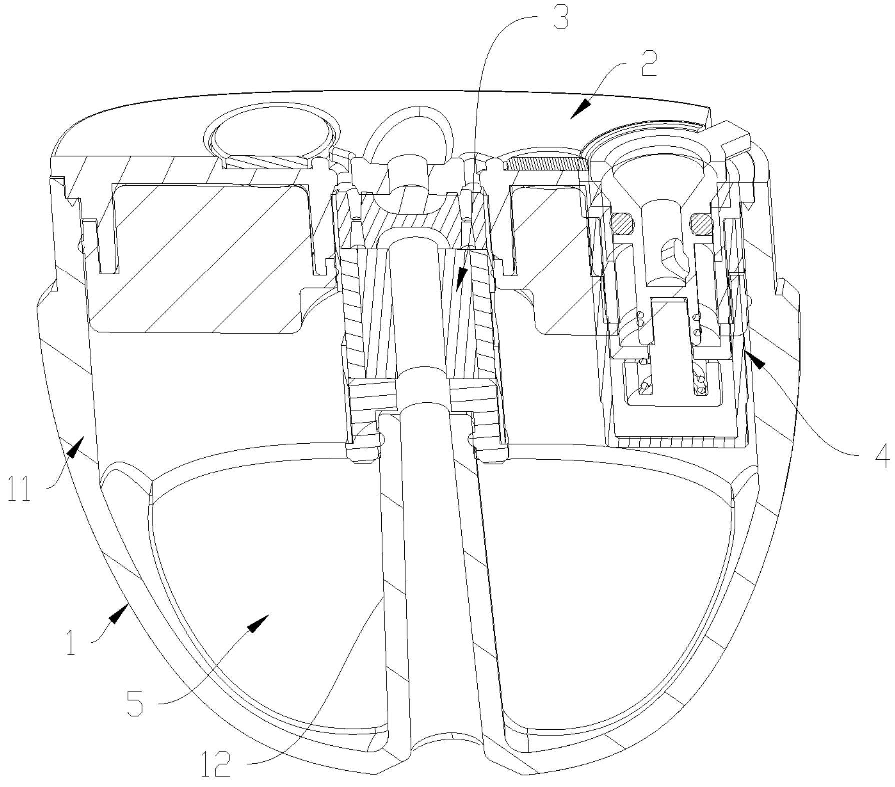
FIG. 3 is a cross-sectional diagram of the atomizer of FIG. 2.
Figure 4:
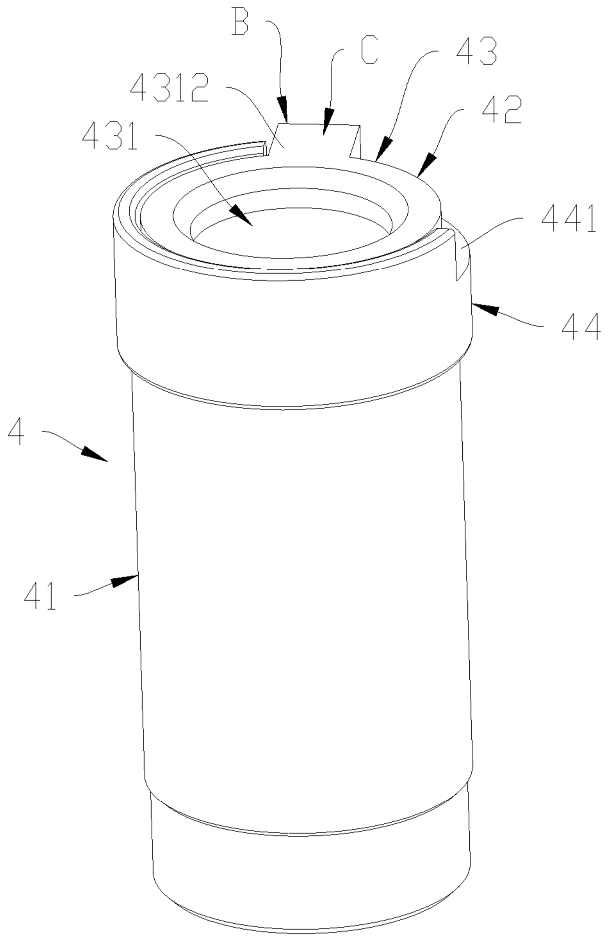
FIG. 4 is a schematic diagram of a liquid injecting structure according to a first embodiment.
Figure 5:
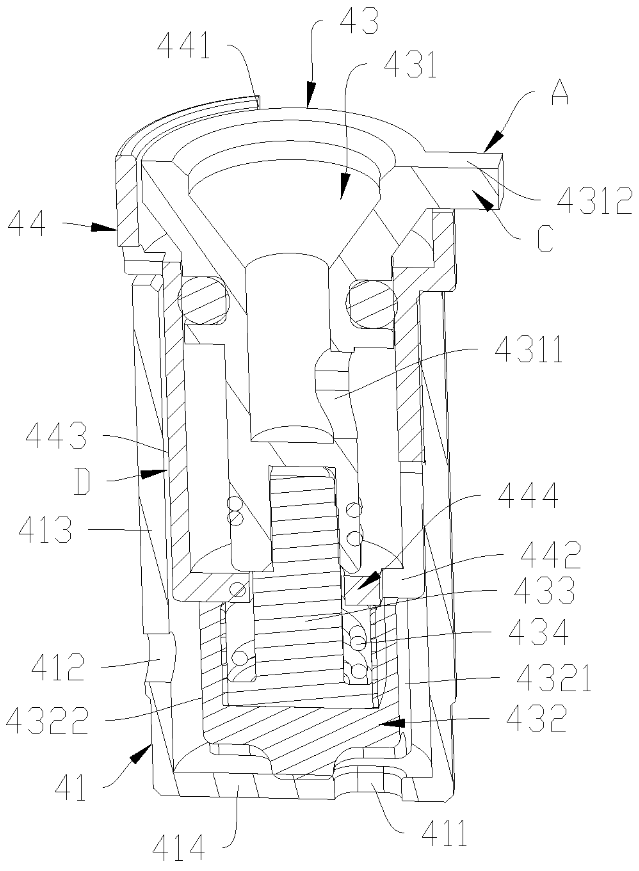
FIG. 5 is a cross-sectional diagram of the liquid injecting structure in the injecting position of FIG. 4.
Figure 6:
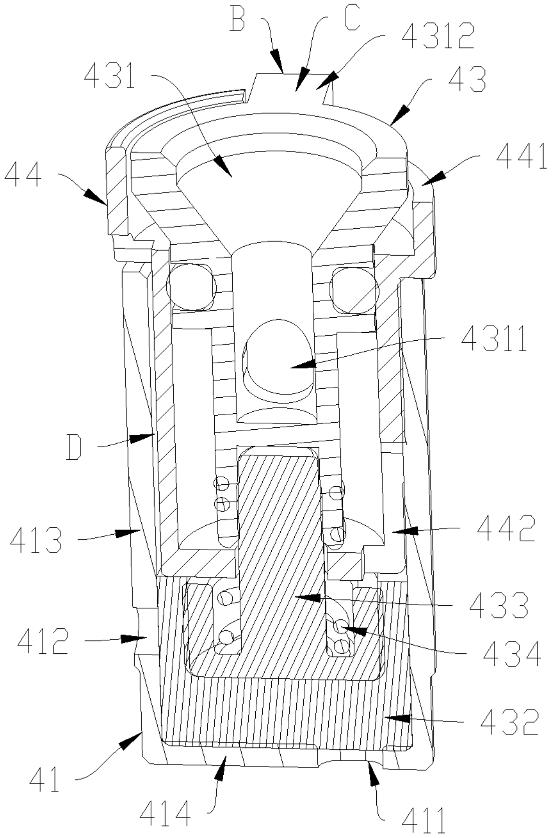
FIG. 6 is a cross-sectional diagram of the liquid injecting structure in the working position of FIG. 4.
Figure 7:
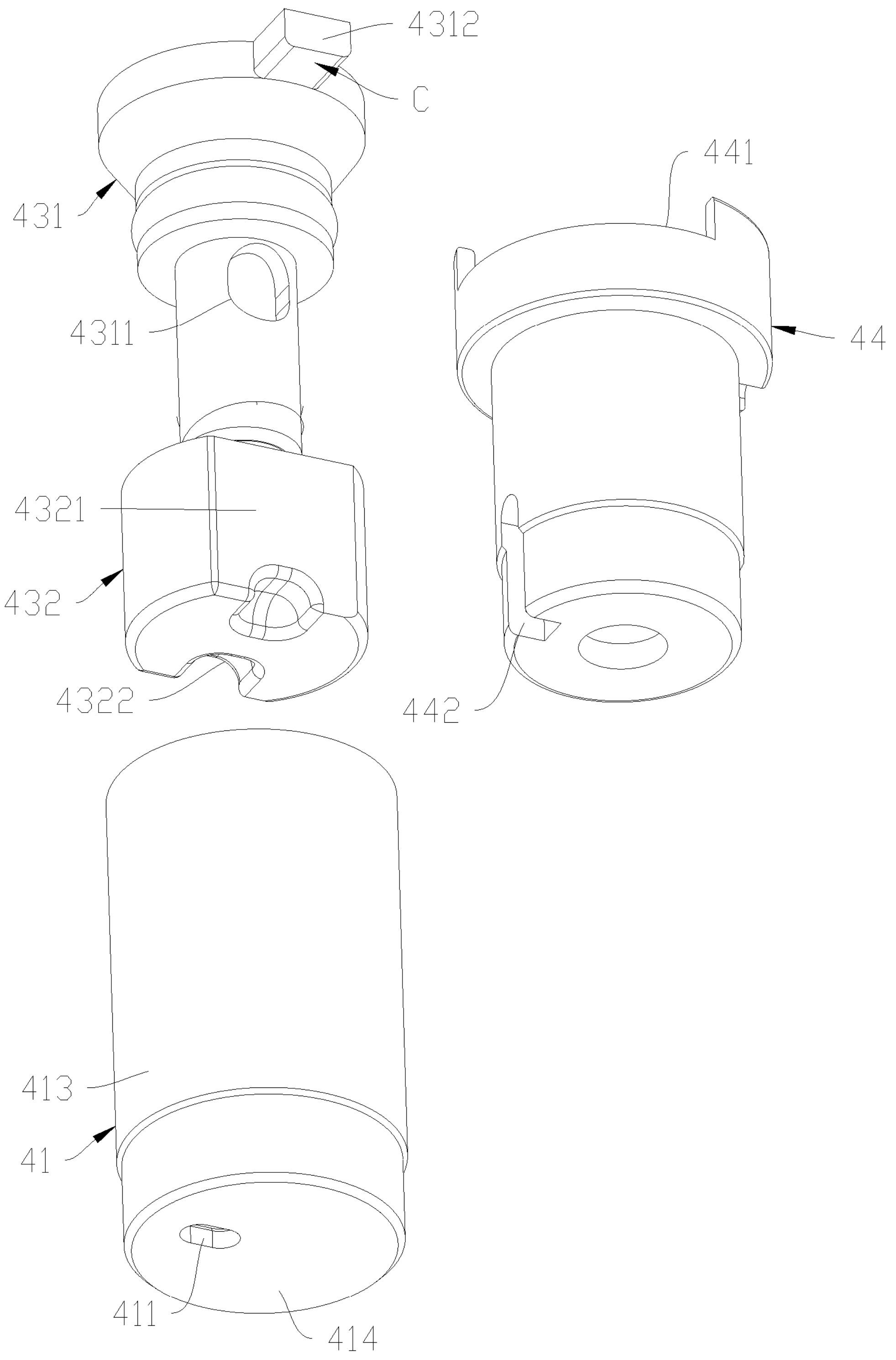
FIG. 7 is an exploded diagram of the liquid injecting structure of FIG. 4.
Figure 8:
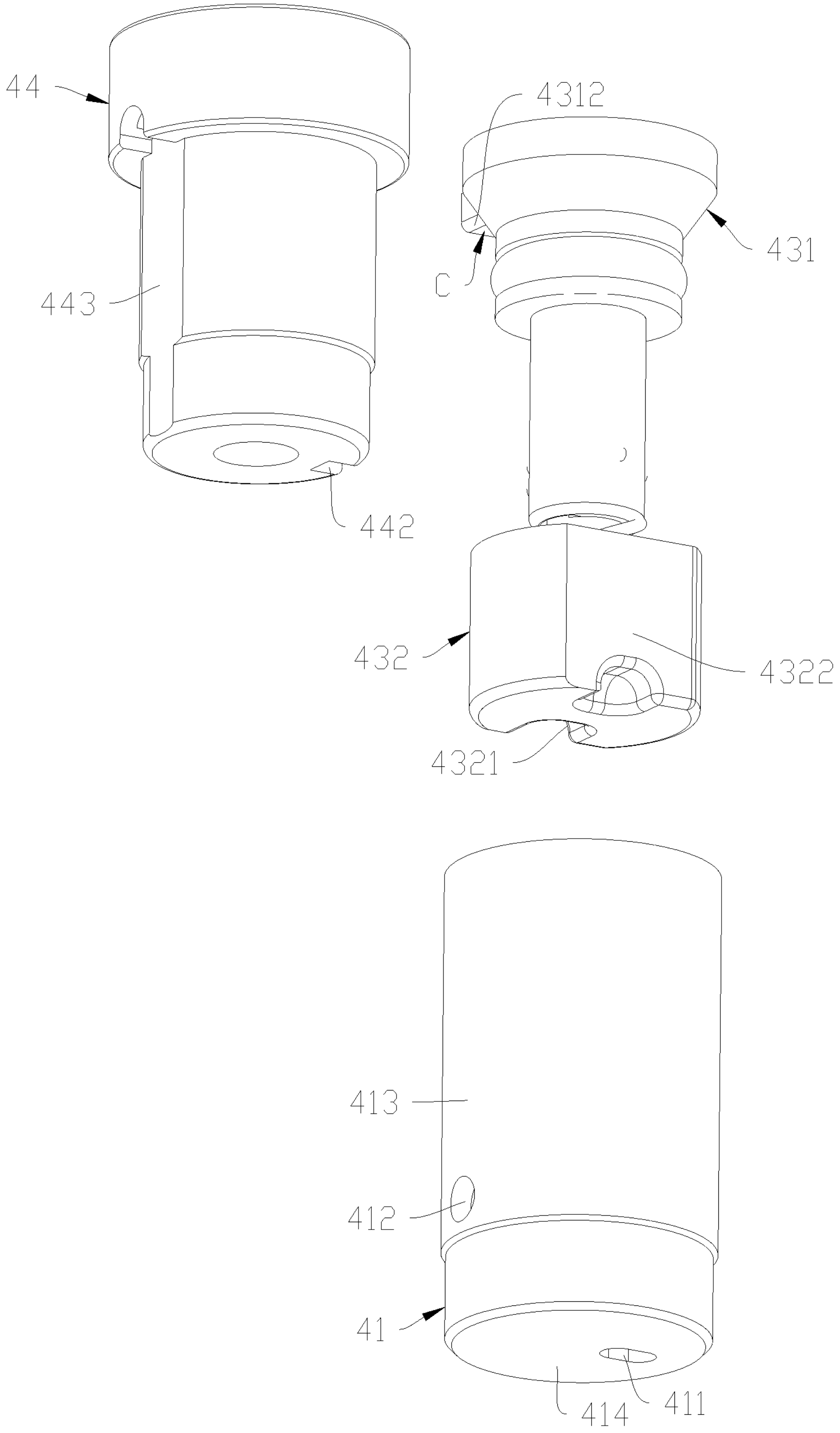
FIG. 8 is an exploded diagram of the liquid injecting structure of FIG. 4 from another perspective.
Figure 9:
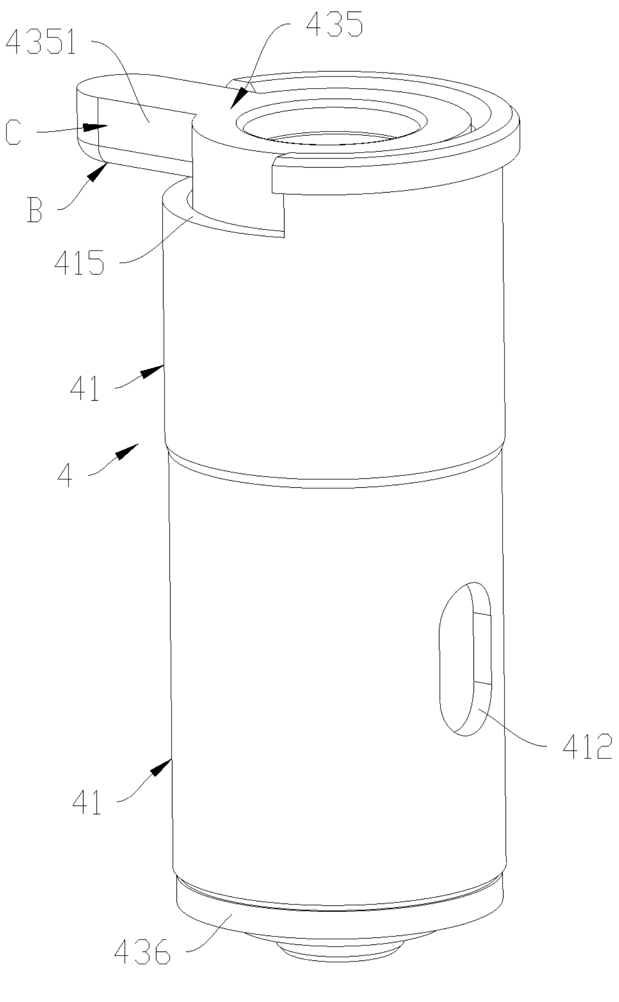
FIG. 9 is a schematic diagram of a liquid injecting structure in the working position according to a second embodiment of the present invention.
Figure 10:
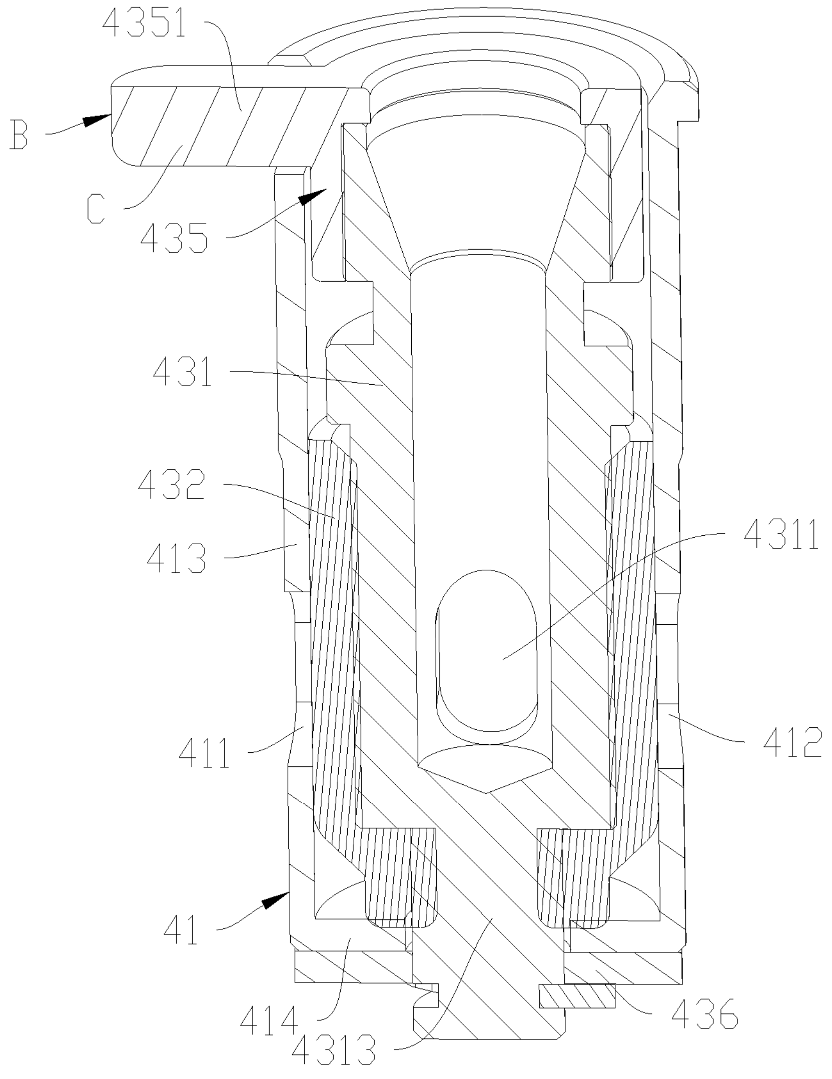
FIG. 10 is a cross-sectional diagram of the liquid injecting structure of FIG. 9.
Figure 11:
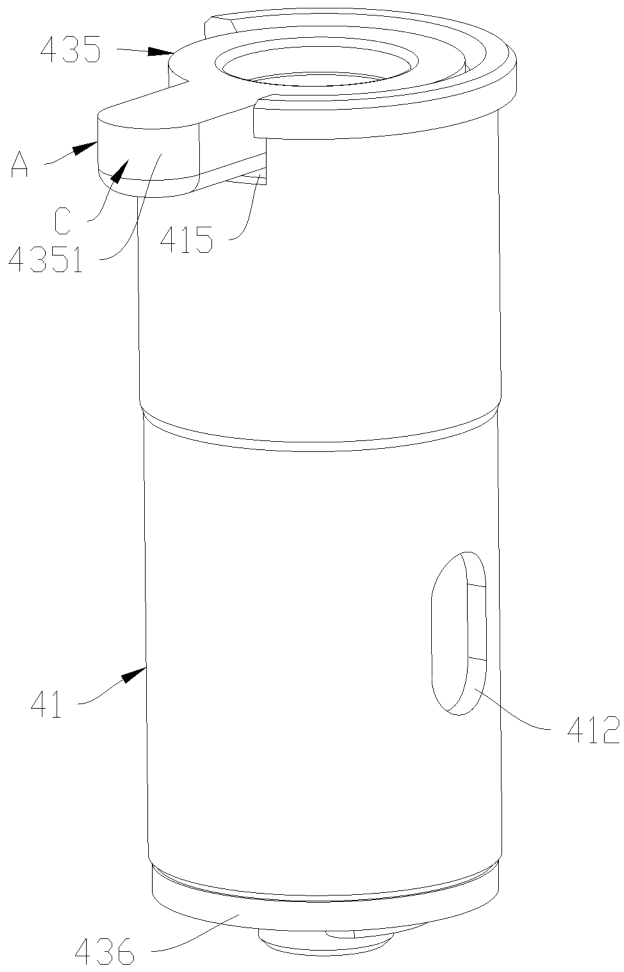
FIG. 11 is a schematic diagram of the liquid injecting structure in the injecting position of FIG. 9.
Figure 12:
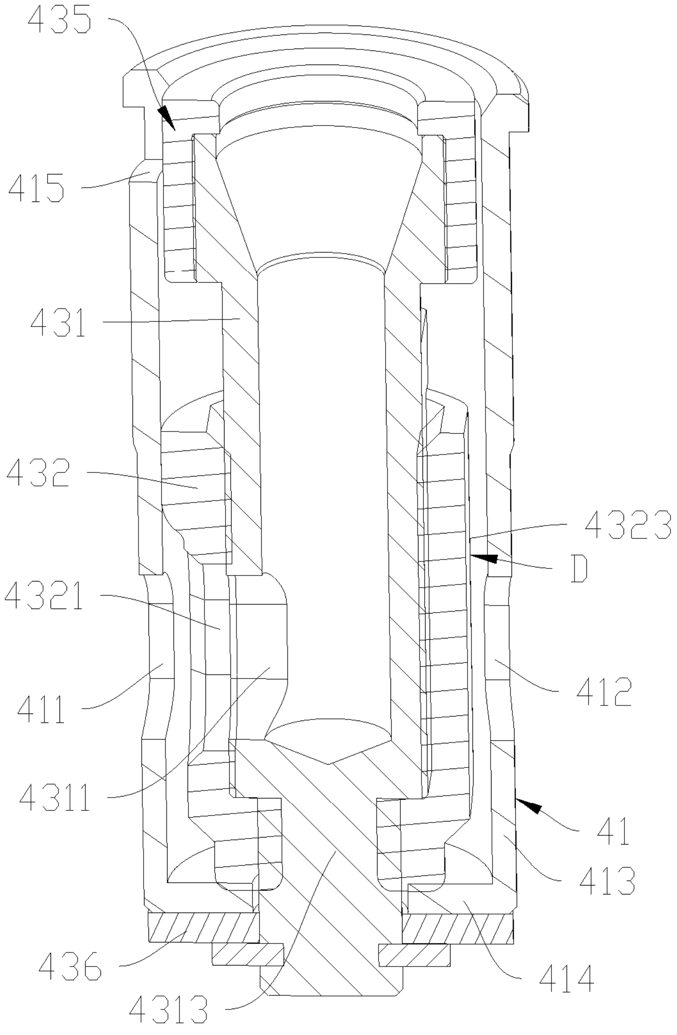
FIG. 12 is a cross-sectional diagram of the liquid injecting structure of FIG. 11.
Figure 13:
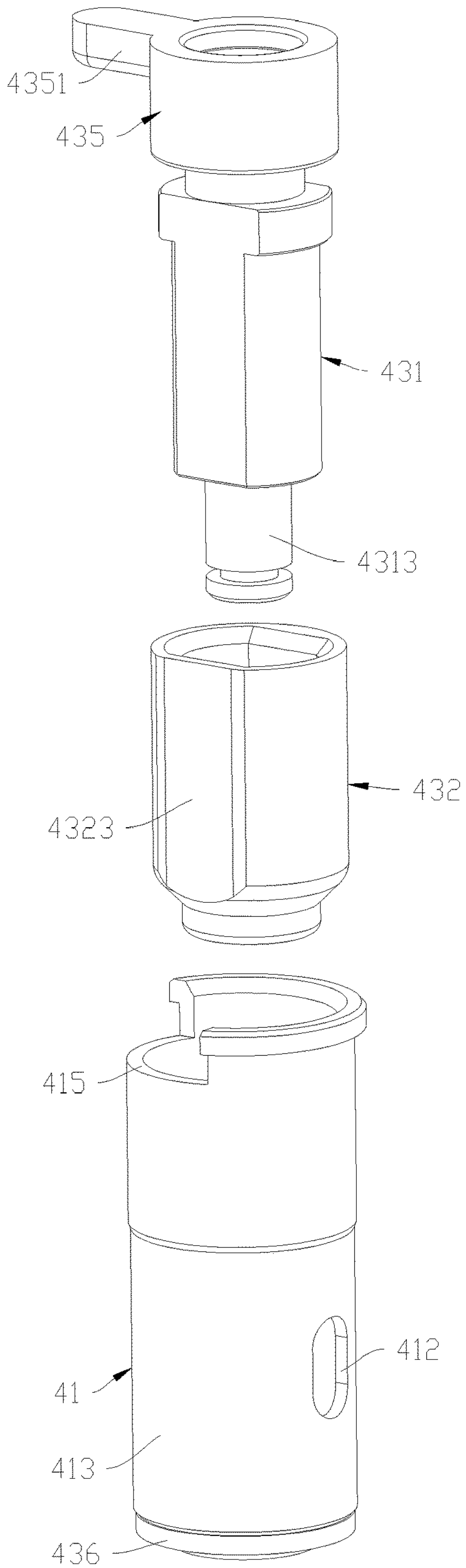
FIG. 13 is an exploded diagram of the liquid injecting structure of FIG. 9.
Figure 14:
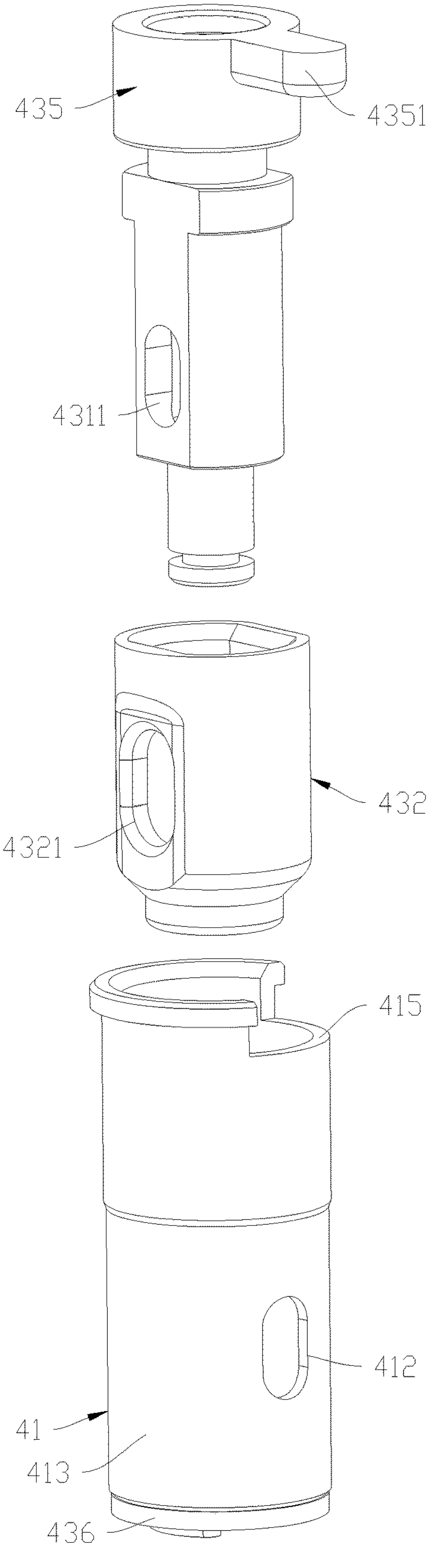
FIG. 14 is an exploded diagram of the liquid injecting structure of FIG. 9 from another perspective.

As shown in FIG. 1 to FIG. 3, an electronic atomizing device in a preferred embodiment of the present invention includes an atomizer. The atomizer includes a nozzle 1, an end cover 2, an atomizing assembly 3 and a liquid injecting structure 4. The nozzle 1 includes a housing 11 and an airflow tube 12 disposed in the housing 11. One end of the nozzle 1 defines an opening which is capped with the end cover 2. The end cover 2 and the nozzle 1 define a liquid storage cavity 5 at a periphery of the airflow tube 12 for storing liquid.

The atomizing assembly 3 is disposed on the airflow tube 12. The liquid in the liquid storage cavity 5 can flow to the atomizing assembly 3 to be adsorbed. The atomizing assembly 3 heats and atomizes the liquid to generate aerosol when electrified. Then the aerosol flows out of the nozzle 1 via the airflow tube 12.

Preferably, the liquid injecting structure 4 is disposed on the end cover 2 in this embodiment. An inlet port 411 of the liquid injecting structure 4 is fluidly communicated with the liquid storage cavity 5. The liquid storage cavity 5 can be injected with liquid via the inlet port of the liquid injecting structure 4. The liquid injecting structure 4 is shielded within a connection position when the atomizer, a battery and the like are assembled, such that the liquid injecting structure 4 cannot be opened easily. In other embodiments, the liquid injecting structure 4 may be disposed on another cavity wall which defines the liquid storage cavity 5, such as on the nozzle 1.

As shown in FIG. 4 to FIG. 8, the liquid injecting structure 4 in some embodiments includes an outer tube 41 and a liquid injection assembly 42 disposed in the outer tube 41. The outer tube 41 defines an inlet port 411. The liquid injection assembly 42 includes a switch assembly 43 which is rotatable between an injecting position A and a working position B relative to the outer tube 41. The switch assembly 43 includes a liquid injection tube 431 which defines an injecting port 4311.

When the switch assembly 43 is in the injecting position A, the injecting port 4311 is fluidly communicated with the inlet port 411, and liquid can be injected into the liquid storage cavity 5 via the liquid injection tube 431. When the switch assembly 43 is in the working position B, the injecting port 4311 is isolated from the inlet port 411, so as to prevent the injected liquid from flowing out.

With the liquid injecting structure 4, the switch assembly 43 is easily able to rotate between the injecting position to realize a liquid injection operation and the working position to stop the liquid injection operation. The rotation operation can prevent children from contacting liquid to improve safety. Besides, when the electronic atomizing device is in the working position for a user's drawing operation, the liquid injecting structure 4 is shielded by the battery and cannot be opened accidentally.

An operating portion C for driving the liquid injection assembly 42 to rotate is provided on the liquid injection assembly 42. The operating portion C in this embodiment can be directly operated by hand, which is user friendly. The operating portion C in other embodiments may be a structure such as a clamping groove, a clamping boss, or a clamping hole, which can be driven to rotate only with a matched tool.

Preferably, the outer tube 41 further defines an exhaust port 412 for exhausting air in the liquid storage cavity 5. An outlet passage D for allowing the exhaust port 412 to be fluidly communicated with an outer atmosphere is defined between an inner side of the outer tube 41 and an outer side of the liquid injection assembly 42.

When the switch assembly 43 is in the injecting position A, the exhaust port 412 is fluidly communicated with the outlet passage D. Thus the air in the liquid storage cavity 5 is able to be exhausted during a liquid injection process into the liquid storage cavity 5, so as to maintain a balance of the air pressure. When the switch assembly 43 is in the working position B, the exhaust port 412 is isolated from the outlet passage D, thus the liquid storage cavity 5 is sealed to maintain a good sealing performance.

The switch assembly 43 in some embodiments includes a first sealing member 432. The first sealing member 432 is circumferentially fixed with the liquid injection tube 431, and rotates synchronously with the liquid injection tube 431. The first sealing member 432 defines a first flow port 4321.

When the switch assembly 43 is in the injecting position A, the inlet port 411 is fluidly communicated with the injecting port 4311 via the first flow port 4321. When the switch assembly 43 is in the working position B, the first flow port 4321 is isolated from the inlet port 411. The first sealing member 432 can improve the sealing performance between the injecting port 4311 of the liquid injection tube 431 and the inlet port 411 of the outer tube 41, and maintain a good sealing performance during rotation.

In a first embodiment, the operating portion C includes a first rotating arm 4312 which is disposed on the liquid injection tube 431. The first rotating arm 4312 extends outwards laterally.

In this embodiment, the liquid injection assembly 42 further includes a tubular second sealing member 44 sleeved between the outer tube 41 and the liquid injection tube 431. An outer end portion of the second sealing member 44 defines an arcuate first rotating recess 441 along a circumferential direction. The first rotating arm 4312 is arranged in the first rotating recess 441 in a manner enabling to swing in the circumferential direction. The first rotating arm 4312 can only swing in the first rotating recess 441, so as to define a rotation range of the switch assembly 43, and to indicate the switching state to the user.

The second sealing member 44 defines a second flow port 442. The second sealing member 44 is circumferentially fixed with the outer tube 41, enabling a relative rotation in a circumferential direction between the second sealing member 44 and the switch assembly 43 when the switch assembly 43 rotates.

The injecting port 4311 and the first flow port 4321 are respectively defined at an inner side and an outer side of the second sealing member 44. When the switch assembly 43 is in the injecting position A, the injecting port 4311 is fluidly communicated with the first flow port 4321 via the second flow port 442. When the liquid injection assembly 42 is in the working position B, the second flow port 442 is isolated from the injecting port 4311 and the first flow port 4321.

The exhaust port 412 is defined on a side wall of the outer tube 41. The first sealing member 432 further defines a third flow port 4322 for fluidly connecting the exhaust port 412 to the outer atmosphere when the switch assembly 43 is in the injecting position A.

A fourth flow port 443 is defined on an outer surface of the second sealing member 44 along an axial direction. The fourth flow port 443 defines the outlet passage D. When the switch assembly 43 is in the injecting position A, the exhaust port 412 is fluidly communicated with the fourth flow port 443 via the third flow port 4322. When the liquid injection assembly 42 is in the working position B, the third flow port 4322 is isolated from the exhaust port 412 and the fourth flow port 443.

Furthermore, the first sealing member 432 is disposed at an inner end of the liquid injection tube 431. The first flow port 4321 and the third flow port 4322 are defined on an outer surface of the first sealing member 432.

Furthermore, the outer tube 41 includes a body 413 and an end wall 414 disposed at an inner end of the body 413. The inlet port 411 is defined on the end wall 414. The first flow port 4321 and the third flow port 4322 are defined on an outer surface of the first sealing member 432 and extend along an axial direction of the first sealing member 432. The second flow port 442 is defined at an end portion of the second sealing member 44 which is proximate to the first sealing member 432. The liquid can enter the liquid storage cavity 5 sequentially through the injecting port 4311, the second flow port 442, the first flow port 4321 and the inlet port 411, guaranteeing the fluid flows smoothly, and avoiding accumulation of the liquid.

The first sealing member 432 and the liquid injection tube 431 are connected by a connecting shaft 433 therebetween. The second sealing member 44 further includes an annular flange 444. The flange 444 is disposed between the liquid injection tube 431 and the first sealing member 432, and isolates the liquid injection tube 431 from the first sealing member 432. The connecting shaft 433 extends through the flange 444, and the flange 444 can achieve a sealed function.

The switch assembly 43 further includes an elastic member 434 sleeved on a peripheral of the connecting shaft 433. Two ends of the elastic member 434 abut against the flange 444 and the first sealing member 432 respectively. The first sealing member 432 is attached to the end wall 414 under an elastic force of the elastic member 434. In other embodiments, the first sealing member 432 may be connected to the liquid injection tube 431 directly.

As shown in FIG. 9 to FIG. 14, the first sealing member 432 in a second embodiment is sleeved between an outer periphery of the liquid injection tube 431 and an inner periphery of the outer tube 41. The first sealing member 432 rotates synchronously with the liquid injection tube 431. The inlet port 411 is defined on a side wall of the outer tube 41.

As in the first embodiment, the outer tube 41 in this embodiment includes a body 413 and an end wall 414 disposed at an inner end of the body 413. A rotating shaft 4313 rotatably matched with the end wall 414 is provided at an inner end of the liquid injection tube 431. The rotating shaft 4313 is locked with the end wall 414 for axial fixing. A sealing ring 436 is provided at an end of the rotating shaft 4313 which extends out of the end wall 414.

As in the first embodiment, the outer tube 41 in this embodiment defines an exhaust port 412 for exhausting air in the liquid storage cavity 5. The exhaust port 412 is defined on a side wall of the outer tube 41. In this embodiment, a fifth flow port 4323 fluidly communicated with an outer atmosphere is defined on an outer surface of the first sealing member 432. The fifth flow port 4323 extends along an axial direction of the first sealing member 432, and defines the outlet passage D.

When the switch assembly 43 is in the injecting position A, the fifth flow port 4323 is fluidly communicated with the exhaust port 412. When the liquid injection assembly 42 is in the working position B, the fifth flow port 4323 is isolated from the exhaust port 412.

In this embodiment, the switch assembly 43 includes a collar 435 sleeved outside an outer end of the liquid injection tube 431. The operating portion C includes a second rotating arm 4351 extending outwards laterally from an outer surface of the collar 435. In other embodiments, the second sealing member 4351 may extend outwards laterally from an outer surface of the liquid injection tube 431.

Furthermore, an outer end portion of the outer tube 41 defines an arcuate second rotating recess 415 along a circumferential direction. The second rotating arm 4351 is arranged in the second rotating recess 415 in a manner enabling to swing in the circumferential direction, to define a rotation range of the switch assembly 43.

It is to be understood that the above-mentioned technical features can be used in any combination without limitation.

The above description is merely exemplary of the invention, and is not intended to limit the scope of the invention; the equivalent structure or equivalent process transformation on the basis of the present invention and of the drawings may be directly or indirectly applied to other related technical fields and shall all fall within the scope of the present invention.

What is claimed is:

1. A liquid injecting structure for an electronic atomizing device, comprising: an outer tube and a liquid injection assembly disposed in the outer tube; wherein, the outer tube defines an inlet port, the liquid injection assembly comprises a switch assembly, the switch assembly is rotatable between an injecting position and a working position relative to the outer tube; the switch assembly comprises a liquid injection tube which defines an injecting port;

when the switch assembly is in the injecting position, the injecting port is fluidly communicated with the inlet port, such that liquid is injected into a liquid storage cavity;

when the switch assembly is in the working position, the injecting port is isolated from the inlet port, wherein the switch assembly comprises a first sealing member which is circumferentially fixed and rotates synchronously with the liquid injection tube, and the first sealing member defines a first flow port; and when the switch assembly is in the injecting position, the inlet port is fluidly communicated with the injecting port via the first flow port; and when the switch assembly is in the working position, the first flow port is isolated from the inlet port.

2. The liquid injecting structure for the electronic atomizing device according to claim 1, wherein the liquid injection assembly further comprises a tubular second sealing member disposed between the outer tube and the liquid injection tube; the second sealing member defines a second flow port, and is circumferentially fixed with the outer tube;

the injecting port and the first flow port are respectively defined in an inner side and an outer side of the second sealing member; when the switch assembly is in the injecting position, the injecting port is fluidly communicated with the first flow port via the second flow port; and when the liquid injection assembly is in the working position, the second flow port is isolated from the injecting port and the first flow port.

3. The liquid injecting structure for the electronic atomizing device according to claim 2, wherein the first sealing member is disposed at an inner end of the liquid injection tube, and the first flow port is defined on an outer surface of the first sealing member.

4. The liquid injecting structure for the electronic atomizing device according to claim 3, wherein the outer tube comprises a body and an end wall disposed at an inner end of the body; the inlet port is defined on the end wall, the first flow port is defined on the outer surface of the first sealing member and extends axially, and the second flow port is defined at an end portion of the second sealing member which is proximate to the first sealing member.

5. The liquid injecting structure for the electronic atomizing device according to claim 4, wherein a connecting shaft is provided to connect the first sealing member and the liquid injection tube, the second sealing member further comprises an annular flange which is disposed between the liquid injection tube and the first sealing member and isolates the liquid injection tube from the first sealing member; the connecting shaft extends through the annular flange.

6. The liquid injecting structure for the electronic atomizing device according to claim 5, wherein the switch assembly further comprises an elastic member sleeved on a peripheral of the connecting shaft; two ends of the elastic member abut against the annular flange and the first sealing member respectively, and the first sealing member is attached to the end wall under an elastic force of the elastic member.

7. The liquid injecting structure for the electronic atomizing device according to claim 2, wherein an operating portion for driving the liquid injection assembly to rotate is provided on the liquid injection assembly, the operating portion comprises a first rotating arm disposed on the liquid injection tube, and the first rotating arm extends outwardly from an outer surface of the liquid injection tube; and an outer end portion of the second sealing member defines an arcuate first rotating recess along a circumferential direction; the first rotating arm is arranged in the first rotating recess in a manner enabling to swing in the circumferential direction, to define a rotation range of the switch assembly.

8. The liquid injecting structure for the electronic atomizing device according to claim 1, wherein the outer tube further defines an exhaust port for exhausting air in the liquid storage cavity, and an outlet passage for allowing the exhaust port to be fluidly communicated with an outer atmosphere is defined between the outer tube and the liquid injection assembly; and when the switch assembly is in the injecting position, the exhaust port is fluidly communicated with the outlet passage; and when the switch assembly is in the working position, the exhaust port is isolated from the outlet passage.

9. The liquid injecting structure for the electronic atomizing device according to claim 8, wherein the exhaust port is defined on a side wall of the outer tube, and the first sealing member further defines a third flow port for fluidly connecting the exhaust port to the outer atmosphere when the switch assembly is in the injecting position.

10. The liquid injecting structure for the electronic atomizing device according to claim 9, wherein the liquid injection assembly further comprises a tubular second sealing member sleeved between the outer tube and the liquid injection tube; a fourth flow port is defined on an outer surface of the second sealing member along an axial direction; when the switch assembly is in the injecting position, the exhaust port is fluidly communicated with the fourth flow port via the third flow port; and when the liquid injection assembly is in the working position, the third flow port is isolated from the exhaust port and the fourth flow port.

11. The liquid injecting structure for the electronic atomizing device according to claim 1, wherein the first sealing member is sleeved between the liquid injection tube and the outer tube, and the inlet port is defined on a side wall of the outer tube.

12. The liquid injecting structure for the electronic atomizing device according to claim 11, wherein the outer tube further defines an exhaust port for exhausting air in the liquid storage cavity, and the exhaust port is defined on a side wall of the outer tube; a fifth flow port fluidly communicated with an outer atmosphere is defined on an outer surface of the first sealing member in an axial direction; and when the switch assembly is in the injecting position, the fifth flow port is fluidly communicated with the exhaust port; and when the liquid injection assembly is in the working position, the fifth flow port is isolated from the exhaust port.

13. The liquid injecting structure for the electronic atomizing device according to claim 1, wherein an operating portion for driving the liquid injection assembly to rotate is provided on the liquid injection assembly, and the operating portion comprises a second rotating arm extending outwardly; and an outer end portion of the outer tube defines an arcuate second rotating recess along a circumferential direction; the second rotating arm is arranged in the second rotating recess in a manner enabling to swing in the circumferential direction, to define a rotation range of the switch assembly.

14. The liquid injecting structure for the electronic atomizing device according to claim 13, wherein the switch assembly comprises a collar sleeved outside an outer end of the liquid injection tube, and the second rotating arm extends outwardly from an outer surface of the collar.

15. The liquid injecting structure for the electronic atomizing device according to claim 11, wherein the outer tube comprises a body and an end wall disposed at an inner end of the body, a rotating shaft rotatably matched with the end wall is provided at an inner end of the liquid injection tube, the rotating shaft is locked with the end wall for axial positioning, and a sealing ring is provided at an end of the rotating shaft which extends out of the end wall.

16. An electronic atomizing device, comprising a liquid storage cavity and a liquid injecting structure, wherein the liquid injecting structure is disposed on a cavity wall which defines the liquid storage cavity;

the liquid injecting structure comprises an outer tube and a liquid injection assembly disposed in the outer tube; the outer tube defines an inlet port which is fluidly communicated with the liquid storage cavity, the liquid injection assembly comprises a switch assembly, the switch assembly is rotatable between an injecting position and a working position relative to the outer tube; the switch assembly comprises a liquid injection tube which defines an injecting port;

when the switch assembly is in the injecting position, the injecting port is fluidly communicated with the inlet port, such that liquid is injected into a liquid storage cavity;

when the switch assembly is in the working position), the injecting port is isolated from the inlet port, wherein the switch assembly comprises a first sealing member which is circumferentially fixed and rotates synchronously with the liquid injection tube, and the first sealing member defines a first flow port; and when the switch assembly is in the injecting position, the inlet port is fluidly communicated with the injecting port via the first flow port; and when the switch assembly is in the working position, the first flow port is isolated from the inlet port.

17. The electronic atomizing device according to claim 16, wherein the liquid injection assembly further comprises a tubular second sealing member disposed between the outer tube and the liquid injection tube; the second sealing member defines a second flow port, and is circumferentially fixed with the outer tube;

the injecting port and the first flow port are respectively defined in an inner side and an outer side of the second sealing member; when the switch assembly is in the injecting position, the injecting port is fluidly communicated with the first flow port via the second flow port; and when the liquid injection assembly is in the working position, the second flow port is isolated from the injecting port and the first flow port.

18. The electronic atomizing device according to claim 16, wherein the outer tube further defines an exhaust port for exhausting air in the liquid storage cavity, and an outlet passage for allowing the exhaust port to be fluidly communicated with an outer atmosphere is defined between the outer tube and the liquid injection assembly; and when the switch assembly is in the injecting position, the exhaust port is fluidly communicated with the outlet passage; and when the switch assembly is in the working position, the exhaust port is isolated from the outlet passage.

* * * * *